(12) United States Patent
Lu et al.

(10) Patent No.: US 12,227,201 B2
(45) Date of Patent: Feb. 18, 2025

(54) ADAPTIVE PERCEPTION BY VEHICLE SENSORS

(71) Applicant: Ford Global Technologies, LLC, Dearborn, MI (US)

(72) Inventors: Jianbo Lu, Northville, MI (US); Timothy Mark Feldkamp, Ann Arbor, MI (US); Sanghyun Hong, Ann Arbor, MI (US); Ling Zhu, Canton, MI (US); Mitch McConnell, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 17/068,151

(22) Filed: Oct. 12, 2020

(65) Prior Publication Data

US 2022/0111859 A1    Apr. 14, 2022

(51) Int. Cl.
   *G08G 1/16*     (2006.01)
   *B60W 30/095*   (2012.01)
   (Continued)

(52) U.S. Cl.
   CPC ...... *B60W 60/001* (2020.02); *B60W 30/0956* (2013.01); *G01C 21/3453* (2013.01); *G01C 21/3602* (2013.01); *G06N 3/04* (2013.01); *G06N 3/08* (2013.01); *G06V 20/58* (2022.01); *G06V 20/588* (2022.01); *G08G 1/16* (2013.01); *B60W 2420/403* (2013.01); *B60W 2520/06* (2013.01); *B60W 2520/10* (2013.01); *B60W 2552/53* (2020.02)

(58) Field of Classification Search
   CPC ........... B60W 60/001; B60W 30/0956; B60W 2552/53; B60W 2420/42; B60W 2520/06; B60W 2520/10; G06V 20/58; G06V 20/588; G01C 21/3453; G01C 21/3602; G06N 3/04; G06N 3/08; G08G 1/16
   USPC ........................................................ 701/25
   See application file for complete search history.

(56) References Cited

U.S. PATENT DOCUMENTS

| 9,881,221 B2 * | 1/2018 | Bala | G06V 40/171 |
| 11,070,721 B2 * | 7/2021 | Agrawal | H04N 5/2628 |

(Continued)

FOREIGN PATENT DOCUMENTS

| DE | 102019115897 A1 * | 6/2020 | B60W 40/00 |

OTHER PUBLICATIONS

Cascading Classifiers, Mar. 12, 2014, Wikipedia (Year: 2014).*

*Primary Examiner* — Elaine Gort
*Assistant Examiner* — Matthias S Weisfeld
(74) *Attorney, Agent, or Firm* — Frank A. MacKenzie; Brooks Kushman P.C.

(57) ABSTRACT

A system comprises a computer including a processor and a memory. The memory storing instructions executable by the processor to cause the processor to determine a perception zone of interest, via a trained perception model, based on at least one of a vehicle parameter or planning data, wherein the vehicle parameter comprises at least one of a vehicle direction or a vehicle speed and the planning data comprises a route and trajectory to be traversed by the vehicle; determine a vehicle route and trajectory based on a subset of sensor data, wherein the subset of sensor data corresponds to the perception zone of interest; and operate the vehicle to traverse the vehicle route and trajectory.

20 Claims, 8 Drawing Sheets

(51) Int. Cl.
*B60W 60/00* (2020.01)
*G01C 21/34* (2006.01)
*G01C 21/36* (2006.01)
*G06N 3/04* (2023.01)
*G06N 3/08* (2023.01)
*G06V 20/56* (2022.01)
*G06V 20/58* (2022.01)

(56) References Cited

U.S. PATENT DOCUMENTS

| | | | |
|---|---|---|---|
| 2007/0198222 A1* | 8/2007 | Schuster | G01D 1/00 |
| | | | 702/182 |
| 2008/0059015 A1* | 3/2008 | Whittaker | G05D 1/0274 |
| | | | 901/1 |
| 2014/0379247 A1* | 12/2014 | Ferguson | B60W 30/16 |
| | | | 701/301 |
| 2017/0371329 A1* | 12/2017 | Giering | G05B 23/0294 |
| 2018/0190091 A1* | 7/2018 | Yuan | H04N 7/181 |
| 2019/0302877 A1* | 10/2019 | Hu | G07C 5/008 |

* cited by examiner

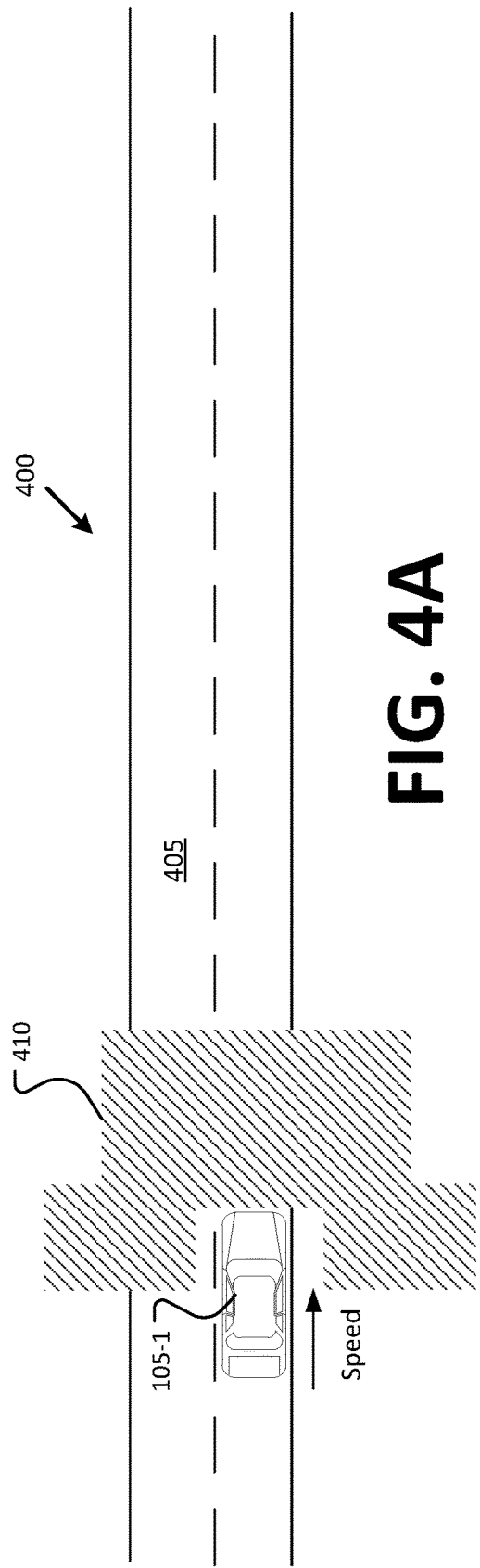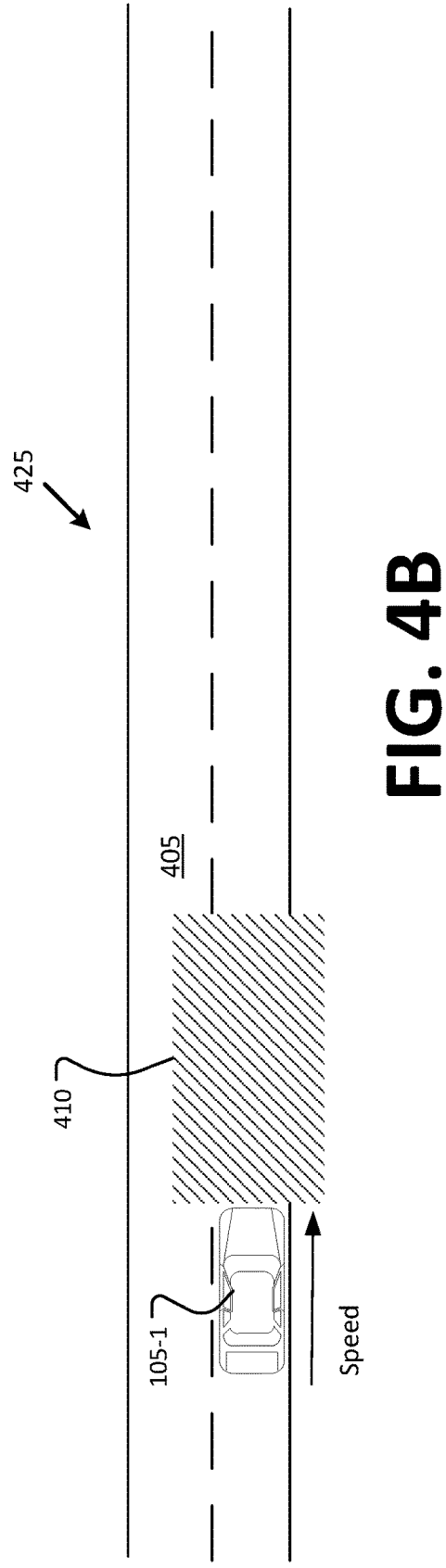

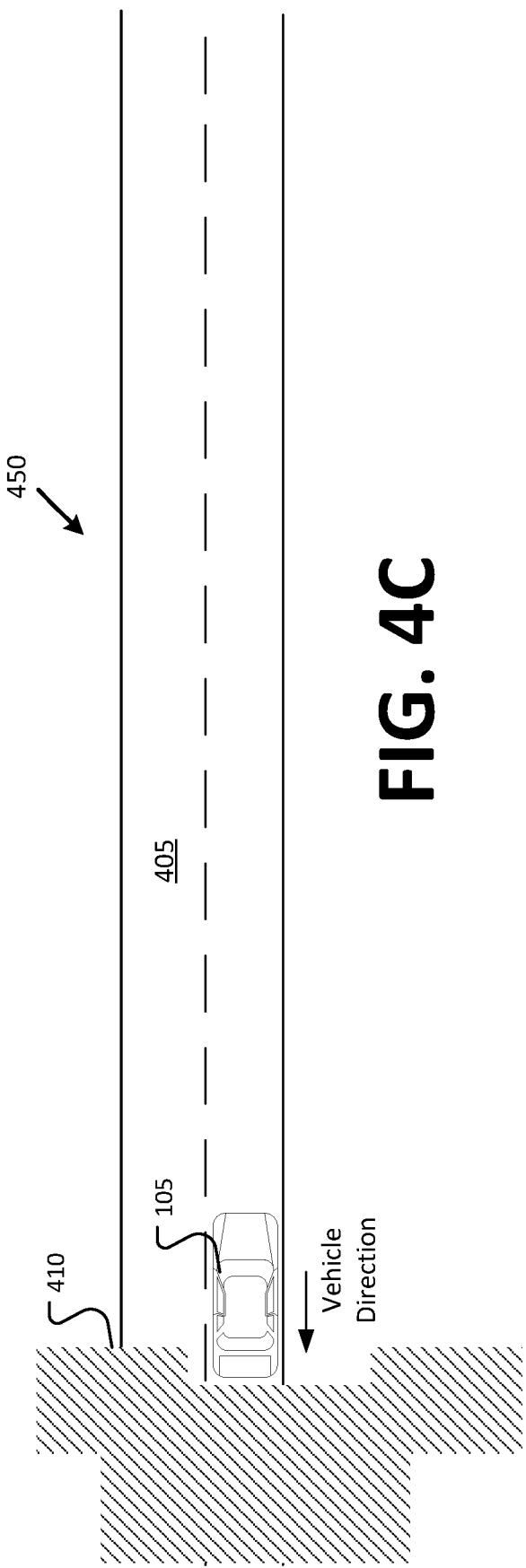

ADAPTIVE PERCEPTION BY VEHICLE SENSORS

BACKGROUND

Vehicles can use sensors to collect data while operating, e.g., including radar, LIDAR, vision systems, infrared systems, and ultrasonic transducers. Vehicles can actuate the sensors to collect data while traveling on roads. Sensor data can be used for operating the vehicle. For example, sensor data can be indicative of objects relative to the vehicle.

BRIEF DESCRIPTION OF THE DRAWINGS

FIGS. 4A through 4C are diagrams illustrating example environments for a vehicle using a perception zone of interest.

DETAILED DESCRIPTION

Figure 1:
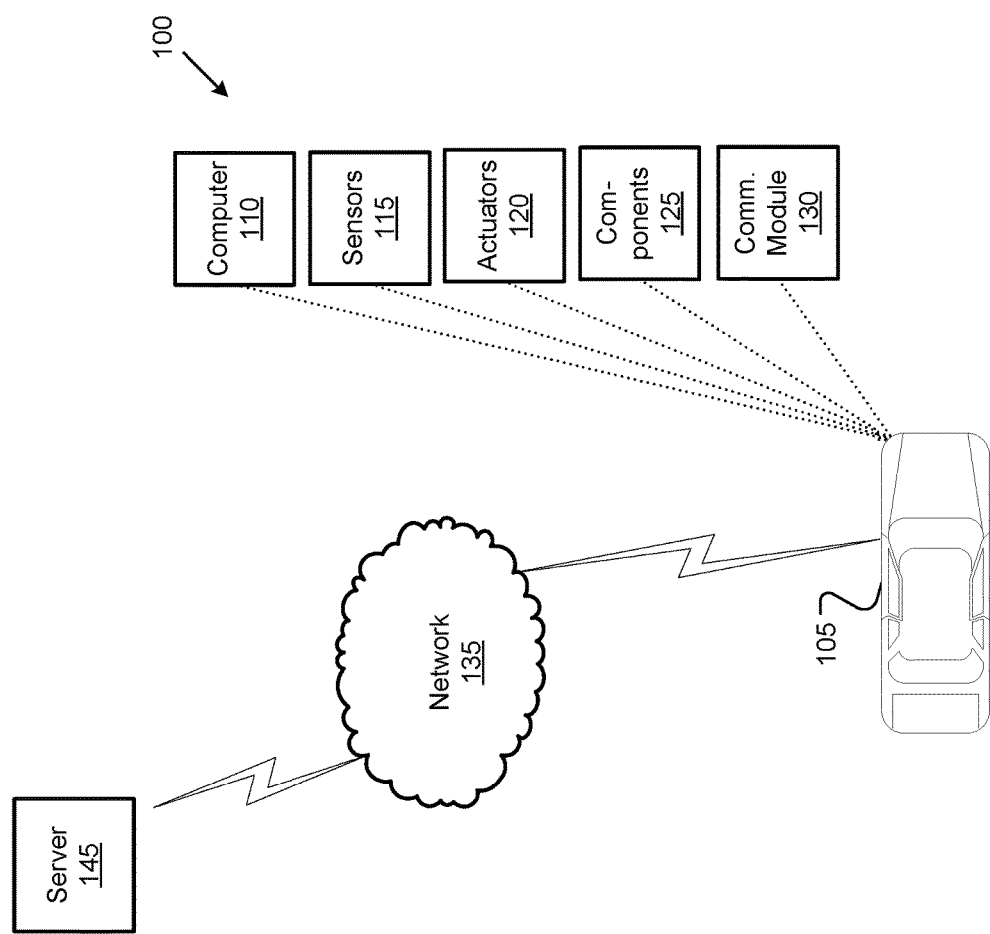
FIG. 1 is a diagram of an example system for determining a perception zone of interest for a vehicle.

A system comprises a computer including a processor and a memory. The memory storing instructions executable by the processor to cause the processor to determine a perception zone of interest, via a trained perception model, based on at least one of a vehicle parameter or planning data, wherein the vehicle parameter comprises at least one of a vehicle direction or a vehicle speed and the planning data comprises a route and trajectory to be traversed by the vehicle; determine a vehicle route and trajectory based on a subset of sensor data, wherein the subset of sensor data corresponds to the perception zone of interest; and operate the vehicle to traverse the vehicle route and trajectory.

In other features, the trained perception model comprises a deep neural network.

In other features, the trained perception model comprises cost-aware cascaded classifiers.

In other features, the processor is further programmed to: update one or more weights of the deep neural network based on the perception zone of interest.

In other features, the processor is further programmed to: assign a higher weight to sensor data comprising the subset of sensor data.

In other features, the processor is further programed to: assign a lower weight to sensor data comprising the subset of sensor data.

In other features, the processor is further programmed to: receive the subset of sensor data from one or more sensors; determine a location of the vehicle based on the subset of sensor data; alter the vehicle route and trajectory based on the determined location; and operate the vehicle to traverse the altered vehicle route and trajectory.

In other features, the processor is further programmed to: determine the location of the vehicle a simultaneous location and mapping (SLAM) technique.

In other features, the processor is further programmed to: determine the vehicle route and trajectory r based on one or more detected objects within the perception zone of interest; and alter the vehicle route and trajectory based on the one or more detected objects.

In other features, the processor is further programmed to apply at least one of an image filtering technique, an object recognition technique, a pattern recognition technique, a semantic segmentation technique, a lane detection technique, an obstacle detection technique, or an image segmentation technique to the subset of sensor data to detect one or more objects.

A method comprises determining a perception zone of interest, via a trained perception model, based on at least one of a vehicle parameter or planning data, wherein the vehicle parameter comprises at least one of a vehicle direction or a vehicle speed and the planning data comprises a route and trajectory to be traversed by the vehicle, determining a vehicle route and trajectory based on a subset of sensor data, wherein the subset of sensor data corresponds to the perception zone of interest; and operating the vehicle to traverse the vehicle route and trajectory.

In other features, the trained perception model comprises a deep neural network.

In other features, the trained perception model comprises cost-aware cascaded classifiers.

In other features, the method further comprises updating one or more weights of the deep neural network based on the perception zone of interest.

In other features, the method further comprises assigning a higher weight to sensor data comprising the subset of sensor data.

In other features, the method further comprises assigning a lower weight to sensor data comprising the subset of sensor data.

In other features, the method further comprises receiving the subset of sensor data from one or more sensors; determining a location of the vehicle based on the subset of sensor data; altering the vehicle route and trajectory based on the determined location; and operating the vehicle to traverse the altered vehicle route and trajectory.

In other features, the method further comprises determining the location of the vehicle a simultaneous location and mapping (SLAM) technique.

In other features, the method further comprises determining the vehicle route and trajectory based on one or more detected objects within the perception zone of interest; and altering the vehicle route and trajectory based on the one or more detected objects.

In other features, the method further comprises applying at least one of an image filtering technique, an object recognition technique, a pattern recognition technique, a semantic segmentation technique, a lane detection technique, an obstacle detection technique, an object tracking technique, a behavior prediction technique, or an image segmentation technique to the subset of sensor data to detect one or more objects.

Processing vehicle sensor data can be computationally intensive and thus inefficient for use in time-sensitive and/or mobile applications. As disclosed herein, sensor data can be more efficiently processed by adaptively modifying the processing of incoming sensor data according to a perception model. A vehicle can include multiple sensors for perceiving aspects of the surrounding environment. Moreover, autonomous driving systems or other systems (e.g., ADAS or advanced driver assist systems such as lane-keeping, cruise control, etc.) within the vehicle process sensor data from the sensors to perceive aspects of the surrounding environment.

Vehicle perception models can be trained using a training dataset that correlates machine vision/perception techniques with various sensor data and determinations of whether the particular techniques are sufficient for the noted sensor data. The perception models can be trained to determine which sensor data is relatively significant for perception and vehicle operation purposes. Once trained, the perception models may cause a vehicle computer to select particular sensor data, or a subset of sensor data, to compute for the purposes of operating the vehicle. For example, the perception models can correlate vehicle parameters, such as vehicle direction and/or vehicle speed, to a subset of vehicle sensors for monitoring particular areas around the vehicle. A vehicle computer can use sensor data from the subset of vehicle sensors for vehicle operation. Accordingly, the presently disclosed systems and methods can improve perception via data from various sensors, e.g., for robotic devices, such as autonomous or semi-autonomous vehicles, by selectively focusing on subsets of the sensor data that are processed and a manner in which the sensor data is processed. In this way, the perception systems can improve the efficiency of processing the sensor data by focusing on aspects that are relevant to and affect the control of a vehicle, for example.

FIG. 1 is a block diagram of an example system 100 for determining and transmitting a path recommendation for one or more vehicles. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a communication network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (LIDAR) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle

105, e.g., through a vehicle-to-vehicle (V2V) or vehicle-to-infrastructure (V2X) wireless communications to another vehicle, to (typically via the communication network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The communication network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 from input data from lidar sensor 115, camera sensor 115, etc., data, to identify a type of object, e.g., vehicle, person, rock, pothole, bicycle, motorcycle, etc., as well as physical features of objects.

Figure 2:
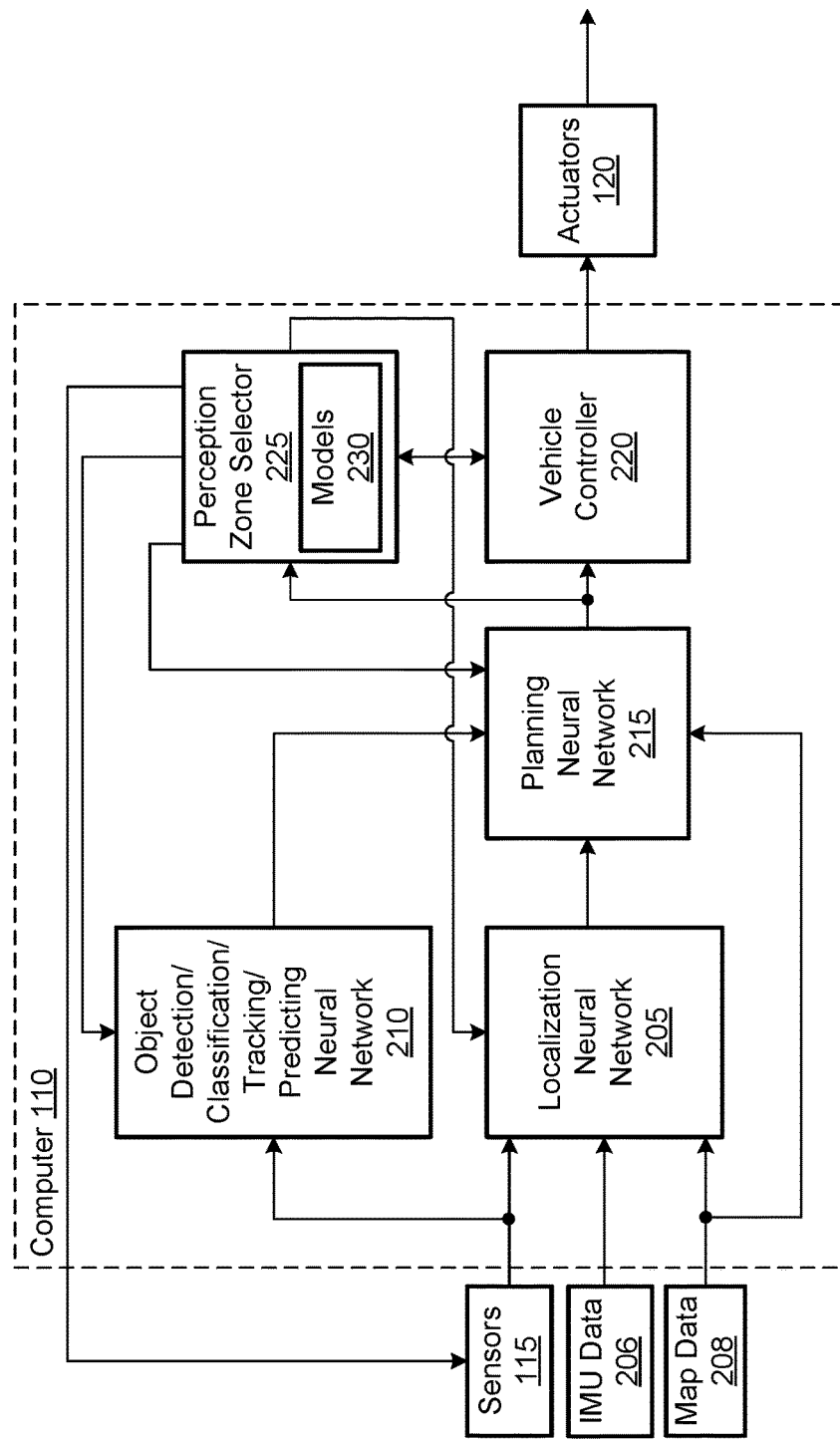
FIG. 2 is a diagram of an example vehicle computer.

As shown in FIG. 2, the computer 110 can include a localization neural network 205, an object detection/classification neural network 210, a planning neural network 215, a vehicle component controller 220, and a perception zone selector 225. The localization neural network 205, the object detection/classification/tracking/predicting neural network 210, the planning neural network 215, the vehicle component controller 220, and the perception zone selector 225 can be software programs loaded in memory and executed by a processor included in computer 110.

The localization neural network 205 can localize the vehicle 105 within an environment and can receive sensor data representing a sensed environment from the sensors 115, inertial measurement data 206 from the sensors 115, e.g., inertial measurement units (IMUs), and map data 208 from the vehicle navigation system. The inertial measurement data 206 can include data indicative of vehicle 105 movement, such as acceleration, orientation, and/or angular velocity. The map data 208 can include information or data on roads, traffic control devices, road markings, structures, features, and/or landmarks in one or more geographic areas, specified according to geo-coordinates, e.g., conventional latitude and longitude coordinates. In some instances, the map data 208 can include aerial views of an area. In some instances, the map data 208 can include ground views of an area, including 360-degree ground views. The map data 208 can include measurements, dimensions, distances, and/or data for one or more items included in the map data 208 and/or relative to other items included in the map data 208. The map data 208 can include a digital map with data about road geometry.

The map data 208 can also include one or more terrain maps. The terrain map(s) can include data about the ground, terrain, roads, surfaces, and/or other features of one or more geographic areas. The terrain map(s) can include elevation data in the one or more geographic areas. The terrain map(s) can define one or more ground surfaces, which can include paved roads, unpaved roads, land, and other things that define a ground surface. In some instances, at least a portion of the map data 208 can be stored locally within the vehicle 105. Alternatively or additionally, at least a portion of the map data 208 can be stored remotely from the vehicle 105. The map data 208 can be updated through over the-air-update (OTA).

The localization neural network 205 determines a grid map of the surrounding environment of the vehicle 105 based on the sensor data, IMU data 206, and/or map data 208. The grid map can be a subset (e.g., less than all) of the map data 208 representing an environment around the vehicle 105, such as the environment within a defined distance of the vehicle 105 based on a current position of the vehicle 105. The defined distance can be a half (½) mile, one (1) mile, two (2) miles, or the like, as set by a vehicle 105 manufacturer or operator. The localization neural network 205 can generate a grid map of the environment identifying objects within the environment and determine a relative distance of the vehicle 105 with respect to the identified objects using the sensor 115 data. The grid map can be defined as a map including evenly spaced horizontal and vertical lines used to identify locations within the grid map. The grid map can be mapped to a coordinate system, such as a GPS coordinate system. The localization neural network 205 can localize the vehicle 105 location within the generated grid map by locating the vehicle relative to the identified objects, i.e., according to the distances and headings of objects relative to the vehicle 105, the neural network 205 can provide a location of the vehicle 105 on the map 208 according to GPS coordinates corresponding to the vehicle 105. The localization neural network 205 can also localize, i.e., specify the vehicle's 105 location within the grid map, the vehicle 105 using the map data 208 and determining a location of the vehicle 105 within the map data 208 based on the GPS coordinates and/or IMU data 115 of the vehicle 105. In an example implementation, the localization neural network 205 can use conventional simultaneous location and mapping (SLAM) techniques to determine a location of the vehicle 105 within the detected environment.

The object detection/classification neural network 210 receives sensor data from the vehicle 105 sensors 115 and can detect and classify objects within a field-of-view of the vehicle 105 sensors 115. For example, a LIDAR sensor 115 can scan the environment surrounding the vehicle 105 and output data representing three-dimensional (3D) points of the environment (this data is sometimes referred to as a LIDAR point cloud). Using the 3D points, the object detection/classification/tracking/predicting neural network 210 can detect one or more objects based on clusters of 3D points and/or classifies the clustered 3D points as a particular object. For example, the object detection/classification/tracking/predicting neural network 210 classifies clusters of 3D points as representing a particular object, such as a pedestrian, another vehicle, or the like. The object detection/classification/tracking/predicting neural network 210 may use various techniques to perform object detection and/or classification, such as image filtering, object recognition techniques, pattern detection, semantic segmentation, lane detection, obstacle detection, and/or image segmentation, e.g., open space segmentation, bounding box segmentation, super-pixel segmentation, and/or pixel segmentation, to perform tracking and predicting of those objects Sensor data, e.g., data received by one or more sensors 115, represents data used by the computer 105 to generate 3D point cloud data. The data, in an example implementation, includes images radar data, and so on. The object detection/classification/tracking/predicting neural network 210 can use conventional object detection and/or classification techniques to detect objects and/or classify objects using the sensor data, and track and predict objects using the sensor data The planning neural network 215 can receive detection data, e.g., data indicating a detected object, and/or classification data, e.g., data indicating what a detected object is classified as, from the object detection/classification/tracking/predicting neural network 210, localization data from the localization neural network 205, and map data 208 and/or vehicle coordinates, e.g., GPS coordinates, from the vehicle navigation system to determine a route and trajectory to a destination. The destination refers to a location the vehicle 105 will travel to/from its initial location. Initially, the planning neural network 215 can determine a route using one or more conventional route optimization algorithms based on the initial position, the destination, one or more routes between the initial position and the destination, and/or objects within the environment of the vehicle 105. As the vehicle 105 is traversing the roadway, the planning neural network 215 can alter, i.e., update, the planning neural network 215 will conduct route and trajectory or path planning based on detected objects, such as other vehicles or obstructions within the roadway. In an example implementation, the planning neural network 215 may determine other routes from a current position of the vehicle 105 and the destination and use the route optimization algorithms to alter the route of the vehicle 105.

The vehicle controller 220 receives planning data from the planning neural network 215 and transmits messages to one or more actuators 120 in accordance with the messages. The actuators 120 can actuate one or more components 125 to cause the vehicle 105 to operate in accordance with the messages. For example, the vehicle controller 220 generates and transmits messages to operate the vehicle 105 so that the vehicle 105 travels the route and trajectory determined by the planning neural network 215.

The perception zone selector 225 receives the planning data from the planning neural network 215 and the messages from the vehicle controller 220. As described herein, the perception zone selector 225 selectively controls the sensors 115, the localization neural network 205, the object detection/classification/tracking/predicting neural network 210, and/or the planning neural network 215 to define a perception zone of interest for the vehicle 105. In an example implementation, the perception zone selector 225 transmits control data to one or more sensors 115, the localization neural network 205, the object detection/classification/tracking/predicting neural network 210, and/or the planning neural network 215 to define a perception zone of interest for the vehicle 105. The perception zone of interest can be defined as a subset of a detected environment. Thus, a subset of the sensors 115 transmit sensor data corresponding to the perception zone of interest. By controlling the perception zone of the vehicle 105, the perception zone selector 225 can be used to process the necessary sensor data to cover the selected perception zone and to pause processing the other sensor data so as to conserve power and/or computational resources of the vehicle 105. The perception zone selector 225, based on its inputs, can modify a sensor 115 coverage and/or a sampling rate of one or more sensors 115.

As shown in FIG. 2, the perception zone selector 225 includes one or more one or more perception models 230 that map input data with a particular subset of sensors 115 that can monitor a perception zone of interest. For example, the perception models 230 may be trained neural network models that define a mapping between vehicle 105 travel direction and/or vehicle 105 speed to one or more subsets of vehicle 105 sensors 115. The perception models 230 can be generated by training a deep neural network that defines perception zones of interest based on what an ordinary driver would perceive surrounding the vehicle 105 in which the driver is driving and the sensors 115 that monitor the perception zones of interest. A perception zone of interest is one or more areas around the vehicle 105 on which the driver's attention is focused corresponding to the vehicle 105 travel direction and/or vehicle 105 speed. A driver's attention can be measured prior to training via a conventional eye-tracking system that measures the driver's eyeball gaze data. For example, a deep neural network can be trained using input data that includes vehicle 105 travel direction and/or vehicle 105 speed and the corresponding perception zones around the vehicle 105 that the driver perceives, e.g., areas that the driver pays attention to as measured by eyeball gaze data.

Figure 3:
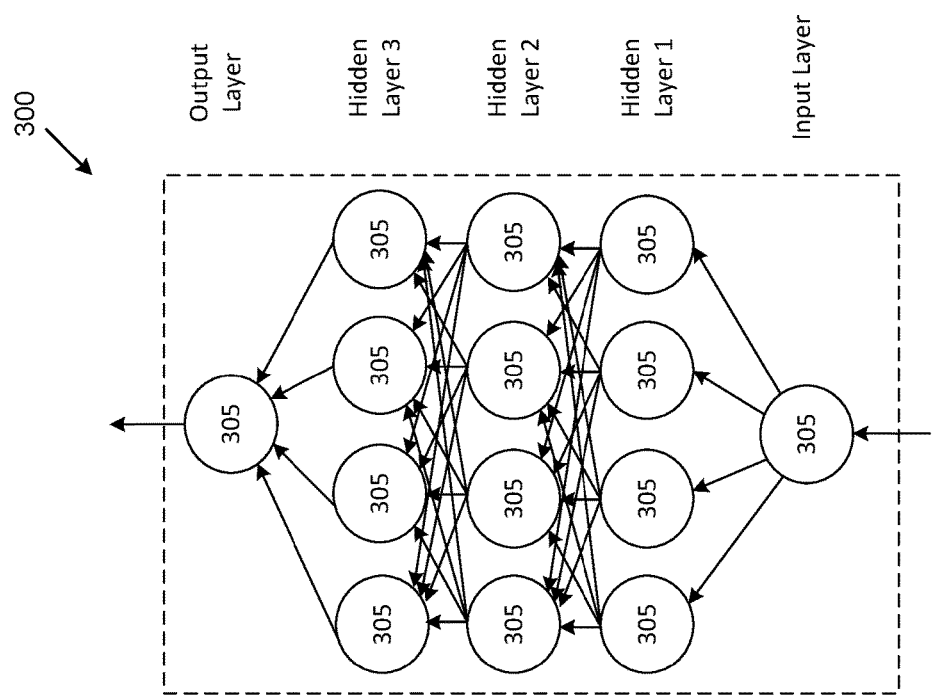
FIG. 3 is a diagram of an example deep neural network.

FIG. 3 illustrates an example deep neural network (DNN) 300 that can perform the functions described above and herein. The localization neural network 205, the object detection/classification/tracking/predicting neural network 210, the planning neural network 215, and/or the perception zone selector 225 can be implemented as one or more DNNs 300. The DNN 300 can be a software program that can be loaded in memory and executed by a processor included in computer 110, for example. In an example implementation, the DNN 300 can include, but is not limited to, a convolutional neural network (CNN), R-CNN (regions with CNN features), Fast R-CNN, and Faster R-CNN. The DNN 300 includes multiple nodes 305, and the nodes 305 are arranged so that the DNN 300 includes an input layer, one or more hidden layers, and an output layer. Each layer of the DNN 300 can include a plurality of nodes 305. While FIG. 3 illustrates three (3) hidden layers, it is to be understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to an activation function, which in turn provides a connected neuron 305 an output. The activation function can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept sensor 115 data, e.g., from the vehicle 105 CAN bus or other network, as input, and to generate a distribution of possible outputs based on the input. The DNN 300 can be trained with ground truth data, i.e., data about a real-world condition or state. For example, the DNN 300 can be trained with ground truth data or updated with additional data by a processor of the server 145. The DNN 300 can be transmitted to the vehicle 105 via the network 135. Weights can be initialized by using a Gaussian distribution, for example, and a bias for each node 305 can be set to zero. Training the DNN 300 can including updating weights and biases via suitable techniques such as back-propagation with optimizations. Ground truth data can include, but is not limited to, data specifying objects within an image or data specifying a physical parameter, e.g., angle, speed, distance, or angle of object relative to another object. For example, the ground truth data may be data representing and objects and object labels for detection and/or classification. In another example, the ground truth data may be data representing object and a relative angle of the object with respect to another object.

FIGS. 4A through 4C illustrate example environments 400, 425, 450, including at least one vehicle 105 traversing a roadway 405. The perception zone selector 225, based on the received data inputs described above, determines a perception zone of interest 410 for the vehicle 105. The perception zone of interest 410 can represent one or more areas around the vehicle 105 to monitor via a subset of vehicle 105 sensors 115, e.g., sensors 115 that can obtain sensor data corresponding to the one or more areas. As discussed above, the perception zone selector 225 can use one or more perception models 230 to determine one or more areas around the vehicle 105 to monitor based the vehicle 105 speed and/or vehicle 105 direction. The perception zone selector 225 can select the one or more areas to monitor by minimizing sensor data from sensors 115 not capturing sensor data within the perception zone of interest 410, e.g., sensors 115 not within the subset of sensors 115.

As the vehicle 105 traverses the roadway 405, the perception zone selector 225 determines the perception zones of interest 410 based on the determined route and trajectory of the vehicle 105. In an example implementation, the perception zone selector 225 receives the determined route and trajectory and the vehicle 105 parameters, e.g., IMU data 206. The vehicle 105 parameters include a speed and/or a direction of the vehicle 105. Based on the determined route and trajectory and/or the vehicle 105 parameters, the perception zone selector 225 determines one or more perception zones of interest 410 to monitor. The perception zone selector 225 determines the perception zones of interest 410 by correlating attributes of the input data, e.g., vehicle 105 speed and/or vehicle 105 direction, with particular areas to monitor around the vehicle 105 via the perception model(s) 230. The perception zones of interest 410 can be defined as areas around the vehicle 105 in which to monitor via the sensor 115 data according to physical characteristics, e.g., sensor 115 range, of the sensors 115.

As discussed above, the perception zone selector 225 can select a perception zone of interest 410 to monitor using the vehicle 105 travel direction and/or vehicle 105 speed as input. Using the vehicle 105 travel direction and/or vehicle 105 speed as input, the perception zone selector 225 accesses one or more perception models 230 that correlate the travel direction and/or vehicle 105 speed to one or more areas around the vehicle 105 to monitor. Based on the one or more areas to monitor, the perception zone selector 225 can cause the computer 110 to account for sensor data received from a subset of sensors 115 oriented to monitor the one or more areas. For example, based on a relatively higher vehicle 105 speed, the perception models 230 of the perception zone selector 225 may define a relatively narrow perception zone of interest 410 (see FIG. 4B) with respect to a relatively slower vehicle 105 speed (see FIG. 4A) to account for potential objects of interest that may be in a direction of travel. In this example, the perception models 230 may also increase a sampling rate of one or more sensors 115 to account for the relatively higher vehicle 105 speed. As shown in FIG. 4C, the perception zone of interest 410 is to a rear of vehicle 105 since the vehicle 105 is reversing.

The perception zone selector 225 can transmit control data to one or more sensors 115, the localization neural network 205, the object detection/classification/tracking/predicting neural network 210, the planning neural network 215, and/or the vehicle controller 220. Based on the control data, the one or more sensors 115, the localization neural network 205, the object detection/classification/tracking/predicting neural network 210, the planning neural network 215, and/or the vehicle controller 220 compute data, such as sensor data from the subset of sensors 115, corresponding to the perception zone of interest 410. For example, each of the localization neural network 205, the object detection/classification/tracking/predicting neural network 210, the planning neural network 215, and/or the vehicle controller 220 may use sensor data corresponding to the perception zone of interest 210 to operate the vehicle 105 based on sensor data corresponding to the perception zone of interest 410.

The sensor data corresponding to other perception zones may be minimized by the localization neural network 205, the object detection/classification/tracking/predicting neural network 210, the planning neural network 215, and/or the vehicle controller 220. Minimizing the sensor data corresponding to other perception zones can be defined as assessing a relatively lesser weight for the purposes of determining a vehicle route and trajectory with respect to the sensor data corresponding to the perception zone of interest 410. Additionally or alternatively, weights for the sensor data corresponding to the perception zone of interest 410 may be relatively increased with respect to the sensor data corresponding to other perception zones. In an example implementation, one or more weights of the DNN 300 may be updated according to the perception zone of interest 410

The perception zone selector 225 may also send control signals to the vehicle controller 220 to enter a fail-safe mode based on a vehicle 105. The perception zone selector 225 may determine to enter the fail-safe mode based on one or more vehicle 105 parameters, such as vehicle 105 speed, vehicle 105 power consumption, vehicle 105 mechanical issues, or the like. The vehicle 105 parameters may be provided to the perception zone selection 225 based on the sensor data and/or IMU data 206. When the vehicle controller 220 enters the fail-safe mode, the vehicle controller 220 may actuate one or more actuators 120 to cause the vehicle 105 to reduce speed and/or pullover to mitigate further vehicle 105 issues.

Figure 5:
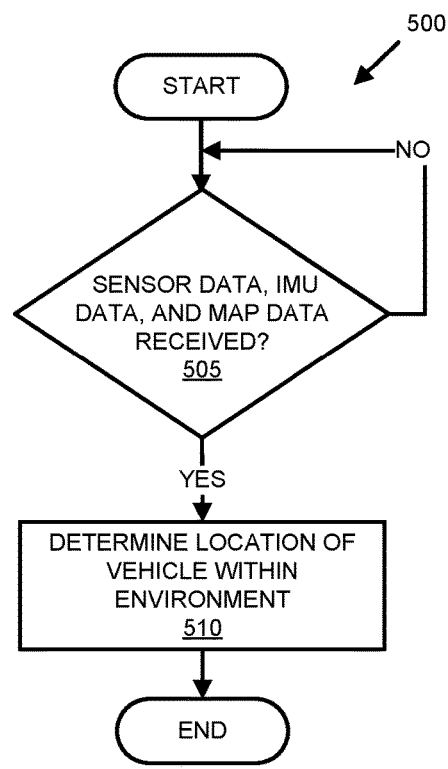
FIG. 5 is a flow diagram illustrating an example process for localizing the vehicle within an environment.

FIG. 5 illustrates a flow diagram of an example process 500 for localizing the vehicle 105 within an environment. Blocks of the process 500 can be executed by the computer 110 of the vehicle 105.

The process 500 begins at block 505, in which a determination is made whether sensor data, IMU data 206, and map data 208 has been received. If the sensor data, IMU data 206, and map data 208 has not been received, the process 500 returns to block 505.

If the sensor data, IMU data 206, and map data 208 has been received, a location of the vehicle 105 is determined within the environment. In an example implementation, the computer 110 can use conventional SLAM techniques to determine a location of the vehicle 105 within the detected environment. The process 500 then ends.

Figure 6:
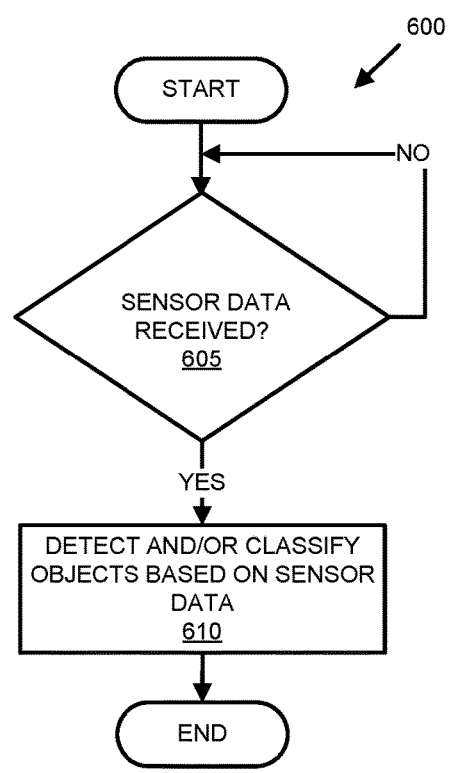
FIG. 6 is a flow diagram illustrating an example process for detecting and/or classifying an object detected within an environment.

FIG. 6 illustrates a flow diagram of an example process 600 for detecting and/or classifying an object detected within an environment. Blocks of the process 600 can be executed by the computer 110 of the vehicle 105.

The process 600 begins at block 605, in which a determination is made whether sensor data has been received. If the sensor data has not been received, the process 600 returns to block 605.

If the sensor data has been received, objects are detected and/or classified based on the received sensor data at block 610. In an example implementation, the computer 110 can apply one or more image filtering techniques, object recognition techniques, pattern recognition techniques, semantic segmentation techniques, lane detection techniques, obstacle detection techniques, and/or image segmentation techniques, e.g., open space segmentation, bounding box segmentation, super-pixel segmentation, pixel segmentation, to perform object detection and/or classification. The process 600 then ends.

Figure 7:
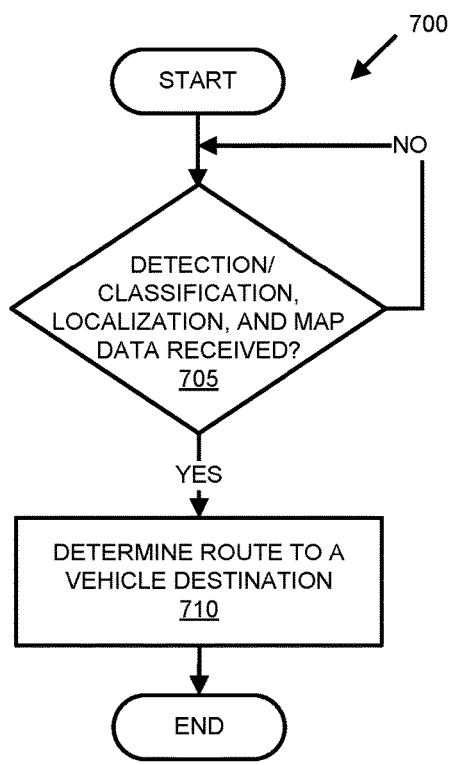
FIG. 7 is a flow diagram illustrating an example process for determining a route and trajectory for the vehicle.

FIG. 7 illustrates a flow diagram of an example process 700 for determining a route and trajectory for the vehicle 105. Blocks of the process 700 can be executed by the computer 110 of the vehicle 105.

The process 700 begins at block 705, in which a determination is made whether detection/classification/tracking/predicting data, localization data, and map data 208 and/or vehicle coordinates have been received. If the classification data, localization data, and map data 208 and/or vehicle coordinates has not been received, the process 700 returns to block 705.

If the classification data, localization data, and map data 208 and/or vehicle coordinates have been received, a route and trajectory to a vehicle 105 destination is determined at block 710. In an example implementation, the computer 110 determines a route and trajectory using one or more known route and trajectory optimization algorithms based on the initial position of the vehicle 105, the destination of the vehicle 105, and one or more route and trajectory s between the initial position and the destination. The computer 110 may alter an already determined route and trajectory based on the classification data, localization data, and map data 208 and/or vehicle coordinates. For example, if an obstruction has been determined to be within a path of the current route and trajectory, the computer 110 may determine another route and trajectory based on a current position of the vehicle 105, the destination of the vehicle 105, and other available route and trajectory s. The process 700 then ends.

Figure 8:
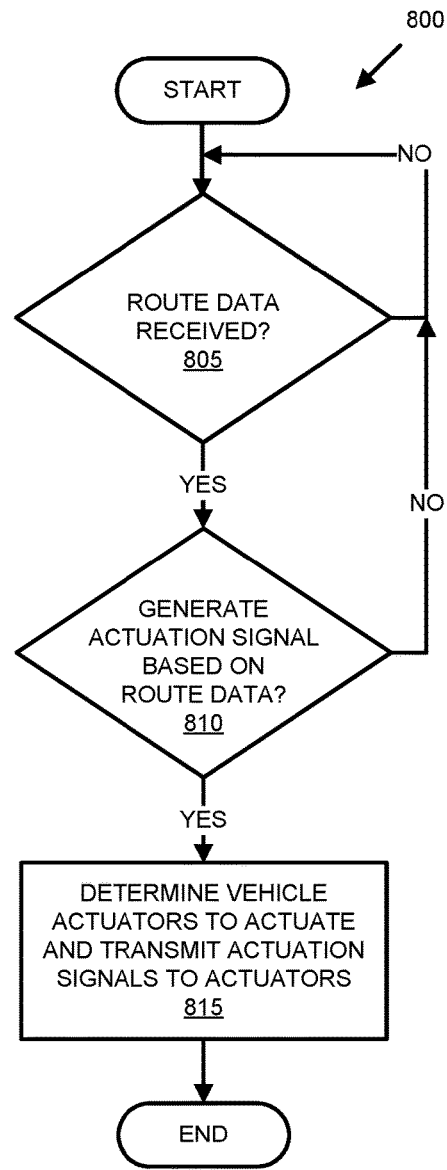
FIG. 8 is a flow diagram illustrating an example process for determining whether to generate an actuation signal for one or more vehicle actuators to control an operation of the vehicle.

FIG. 8 illustrates a flow diagram of an example process 800 for determining whether to generate an actuation signal for one or more vehicle 105 actuators 120 to control an operation of the vehicle 105. Blocks of the process 800 can be executed by the computer 110 of the vehicle 105.

The process 800 begins at block 805, in which a determination is made whether a route and trajectory data has been received. If the route and trajectory data has not been received, the process 800 returns to block 805.

If the route and trajectory data has been received, a determination is made whether to generate an actuation signal at block 810. The computer 110 can determine whether a route and trajectory has been altered from previously received route and trajectory s. If the route and trajectory has been altered, the computer 110 determines which actuators 120 should be actuated to alter a vehicle 105 course. Otherwise, the computer 110 may determine that no actuation is required. If no actuators are to be actuated, the process returns to block 805. Otherwise, the computer 110 determines which actuators should be actuated so that the vehicle can transition to the altered route and trajectory and transmits actuation signals to the determined actuators 120 at block 815. The process 800 then ends.

Figure 9:
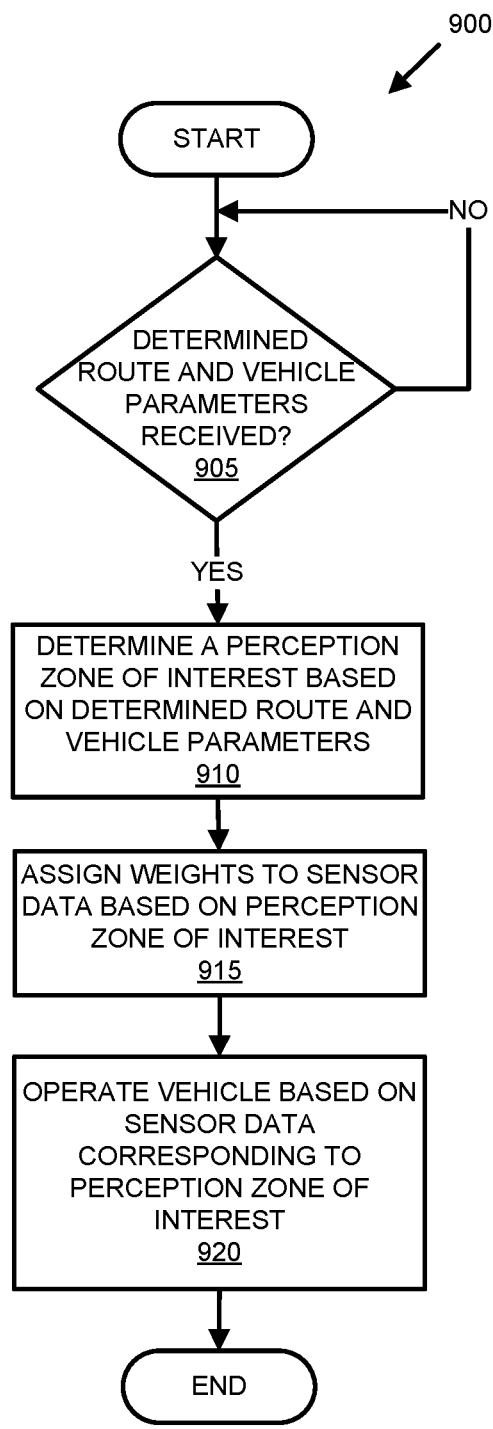
FIG. 9 is a flow diagram illustrating an example process for determining a perception zone of interest for the vehicle.

FIG. 9 illustrates a flow diagram of an example process 900 for determining a perception zone of interest for the vehicle 105. Blocks of the process 900 can be executed by the computer 110 of the vehicle 105.

The process 900 begins at block 905, in which a determination is made whether a determined route and trajectory and vehicle 105 parameters have been received. If the determined route and trajectory and vehicle 105 parameters have not been received, the process 900 returns to block 905.

If the determined route and trajectory and vehicle 105 parameters have been received, the perception models 230 determine a perception zone of interest at block 910. The perception models 230 can be trained to correlate attributes of the input data, such as the determined route and trajectory and the vehicle 105 parameters, with particular perception techniques or sets of perception techniques for determining the perception zone of interest. The perception models 230 can define areas of higher interest for the vehicle 105 while traversing a roadway. For example, as discussed above, regions ahead of a vehicle 105 traveling in a forward direction is of higher interest than regions behind the vehicle 105.

At block 915, the computer 110 assigns weights to sensor data based on the determined perception zone of interest. For example, the computer 110 can assign relatively higher weights to sensor data from the subset of sensors 115 monitoring the perception zone of interest 410. Alternatively or additionally, the computer can assign relatively lower weights for processing to sensor data from sensors 115 that do not capture sensor data within the perception zone of interest 410. At block 920, the computer 110 operates the vehicle 105 based on sensor data corresponding to the perception zone of interest. The process 900 then ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, N.Y., the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to cause the processor to:
   determine a perception zone of interest comprising one or more areas around a vehicle on which a driver's attention is focused via a trained perception model that is trained with driver eye gaze data, wherein the perception zone of interest is determined based on correlating vehicle parameters including at least a vehicle direction and a vehicle speed with the one or more areas around the vehicle;
   process sensor data from a subset of sensors that correspond to the perception zone of interest that was determined based on the one or more areas around the vehicle on which the driver's attention is focused, and pause processing or reduce sampling of other sensor data from other sensors that do not correspond to the perception zone of interest to conserve power and/or computational resources;
   determine an altered vehicle route and trajectory based on the sensor data from the subset of sensors that correspond to the perception zone of interest; and
   operate the vehicle to traverse the altered vehicle route and trajectory.

2. The system of claim 1, wherein the trained perception model comprises a deep neural network.

3. The system of claim 2, wherein the trained perception model comprises cost-aware cascaded classifiers.

4. The system of claim 2, wherein the processor is further programmed to: update one or more weights of the deep neural network based on the perception zone of interest.

5. The system of claim 4, wherein the processor is further programmed to: assign a higher weight to the sensor data from the subset of sensors.

6. The system of claim 4, wherein the processor is further programed to: assign a lower weight to the other sensor data from the other sensors.

7. The system of claim 1, wherein the processor is further programmed to:
   receive the sensor data from the subset of sensors;
   determine a location of the vehicle based on the sensor data; and
   alter the vehicle route and trajectory based on the determined location.

8. The system of claim 7, wherein the processor is further programmed to: determine the location of the vehicle using a simultaneous location and mapping (SLAM) technique.

9. The system of claim 1, wherein the processor is further programmed to: determine the vehicle route and trajectory based on one or more detected objects within the perception zone of interest; and alter the vehicle route and trajectory based on the one or more detected objects.

10. The system of claim 9, wherein the processor is further programmed to apply at least one of an image filtering technique, an object recognition technique, a pattern recognition technique, a semantic segmentation technique, a lane detection technique, an obstacle detection technique, or an image segmentation technique to the subset of sensor data to detect one or more objects.

11. A method comprising:
determining a perception zone of interest comprising one or more areas around a vehicle on which a driver's attention is focused via a trained perception model that is trained with driver eye gaze data, wherein the perception zone of interest is determined based on correlating vehicle parameters including at least a vehicle direction and a vehicle speed with the one or more areas around the vehicle;
processing sensor data from a subset of sensors that correspond to the perception zone of interest that was determined based on the one or more areas around the vehicle on which the driver's attention is focused, and pausing processing or reducing sampling of other sensor data from other sensors that do not correspond to the perception zone of interest to conserve power and/or computational resources;
determining an altered vehicle route and trajectory based on the sensor data from the subset of sensors that correspond to the perception zone of interest; and
operating the vehicle to traverse the altered vehicle route and trajectory.

12. The method of claim 11, wherein the trained perception model comprises a deep neural network.

13. The method of claim 12, wherein the trained perception model comprises cost-aware cascaded classifiers.

14. The method of claim 12, further comprising: updating one or more weights of the deep neural network based on the perception zone of interest.

15. The method of claim 14, further comprising:
assigning a higher weight to the sensor data from the subset of sensors.

16. The method of claim 14, further comprising:
assigning a lower weight to the other sensor data from the other sensors.

17. The method of claim 11, further comprising:
receiving the sensor data from the subset of sensors;
determining a location of the vehicle based on the sensor data; and
altering the vehicle route and trajectory based on the determined location.

18. The method of claim 17, further comprising:
determining the location of the vehicle using a simultaneous location and mapping (SLAM) technique.

19. The method of claim 11, further comprising: determining the vehicle route or trajectory based on one or more detected objects within the perception zone of interest; and altering the vehicle route and trajectory based on the one or more detected objects.

20. The method of claim 19, further comprising: applying at least one of an image filtering technique, an object recognition technique, a pattern recognition technique, a semantic segmentation technique, a lane detection technique, an obstacle detection technique, or an image segmentation technique to the subset of sensor data to detect one or more objects.

* * * * *